United States Patent
Wu

(10) Patent No.: US 7,895,410 B1
(45) Date of Patent: Feb. 22, 2011

(54) METHOD AND APPARATUS FOR FACILITATING ADAPTIVE PAGE SIZES

(75) Inventor: Yuguang Wu, Santa Clara, CA (US)

(73) Assignee: Oracle America, Inc., Redwood Shores, CA (US)

( * ) Notice: Subject to any disclaimer, the term of this patent is extended or adjusted under 35 U.S.C. 154(b) by 335 days.

(21) Appl. No.: 11/218,817

(22) Filed: Sep. 2, 2005

Related U.S. Application Data

(60) Provisional application No. 60/690,794, filed on Jun. 14, 2005.

(51) Int. Cl.
*G06F 12/02* (2006.01)
(52) U.S. Cl. .................. 711/203; 711/207; 711/208
(58) Field of Classification Search .................. 711/203, 711/207, 208
See application file for complete search history.

(56) References Cited

U.S. PATENT DOCUMENTS

| | | | |
|---|---|---|---|
| 6,715,057 B1 * | 3/2004 | Kessler et al. ............... | 711/207 |
| 6,854,046 B1 * | 2/2005 | Evans et al. .................. | 711/203 |
| 7,366,869 B2 * | 4/2008 | Sartorius et al. ............. | 711/207 |
| 2004/0215919 A1 * | 10/2004 | Emmes ......................... | 711/208 |
| 2005/0027961 A1 * | 2/2005 | Zhang ........................... | 711/207 |
| 2005/0027962 A1 * | 2/2005 | Zhang et al. ................. | 711/207 |

* cited by examiner

*Primary Examiner*—Yong Choe
(74) *Attorney, Agent, or Firm*—Park, Vaughn, Fleming & Dowler LLP; Mark Spiller

(57) ABSTRACT

One embodiment of the present invention provides a system and a method for performing a page-table lookup in a manner that supports adaptive page sizes. During operation, the system receives a virtual address. Next, the system looks up this virtual address in a page table. Since each entry in the page table maintains a page size, the lookup process involves using the page size to determine the number of bits that must be compared to find a matching page table entry. A page table entry matches the virtual address if the determined number of bits in the virtual address match the virtual address in the page table entry. If a matching page table entry is found, the system returns the physical page address from the matching page table entry.

19 Claims, 4 Drawing Sheets

METHOD AND APPARATUS FOR FACILITATING ADAPTIVE PAGE SIZES

RELATED APPLICATIONS

This application hereby claims priority under 35 U.S.C. §119 to U.S. Provisional Patent Application No. 60/690,794, filed on 14 Jun. 2005, entitled "Paged Segmentation with Mutable Pages," by inventor Yuguang Wu. The present application hereby incorporates by reference the above-referenced provisional patent application.

BACKGROUND

1. Field of the Invention

The present invention generally relates to paging techniques in computer systems. More specifically, the present invention relates to paging techniques that facilitate adaptive page sizes.

2. Related Art

Modern computer operating systems allocate memory to programs in small blocks called "pages." Pages are moved into and out of random-access memory through a process which is referred to as "paging." Paging mechanisms enable a program and its associated data to be split across non-contiguous memory, which reduces memory fragmentation. Paging combined with virtual memory techniques allow a virtual address space to exceed the physical memory size, and also allows the system to present separate virtual address spaces to different programs or program segments.

Paging is typically implemented by using a contiguous page table to keep track of virtual memory pages. Note that the page table size is inversely proportional to page size, since as the page size increases there are fewer page table entries. Note also that mapping a virtual address to a physical address typically involves multiple levels of indirection, which results in multiple memory references prior to accessing actual data. A translation look-aside buffer (TLB) can be used to cache recently-translated addresses to speed up this translation process.

Page size plays an important role in overall system behavior and performance. Since the size of the page table is inversely related to the page size, larger pages reduce both page table and TLB overheads and result in higher TLB hit rates. On the other hand, larger pages can induce additional data sharing among processes, and can consequently incur higher data coherence overhead. Since all existing paging schemes use either a single fixed page size for the entire system or a very small number of selectable page sizes which can only be manually set for a process and remain unchanged throughout the process' execution, choosing an optimal page size that suites a wide range of applications can be a difficult task.

Hence, what is needed is a method and an apparatus for alleviating some of the above-described problems with paging.

SUMMARY

One embodiment of the present invention provides a system and a method for performing a page-table lookup in a manner that supports adaptive page sizes. During operation, the system receives a virtual address. Next, the system looks up this virtual address in a page table. Since each entry in the page table maintains a page size, the lookup process involves using the page size to determine the number of bits that must be compared to find a matching page table entry. A page table entry matches the virtual address if the determined number of bits in the virtual address match the virtual address in the page table entry. If a matching page table entry is found, the system returns the physical page address from the matching page table entry.

In a variation on this embodiment, each entry in the page table can specify a different physical page size. Furthermore, the page size of each physical page can change dynamically and independently of other pages.

In a further variation on this embodiment, physical pages are disjoint, which means that a virtual address can only be present in one physical page.

In a variation on this embodiment, the system maintains a segment table that includes entries for different memory segments. Each segment table entry contains both a pointer to the page table for the corresponding memory segment and a physical page size for all of the physical pages in the memory segment.

In a further variation on this embodiment, the system updates the page table whenever a physical page is split or merged.

In a further variation on this embodiment, the system can change physical pages sizes to optimize performance criteria, which can include: minimizing memory overhead and fragmentation of the page table; minimizing the miss ratio of a TLB; minimizing overhead in an input/output (I/O) system; reducing contention for memory pages; or minimizing a heuristically-weighted sum of several criteria.

In a further variation on this embodiment, the system first attempts to look up the page table entry in a TLB that caches recently-accessed page table entries.

In a further variation on this embodiment, if the TLB lookup fails, the system looks up the physical page by performing a binary search on the page table to determine which entry corresponds to the virtual address. The system orders the page table by the starting address of the virtual pages to facilitate this binary search.

In a variation on this embodiment, the system implements a number of paging variations, including: segmented paging, traditional paging, multi-level hierarchical paging, and paged segmentation.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Components of Paging

Figure 1:
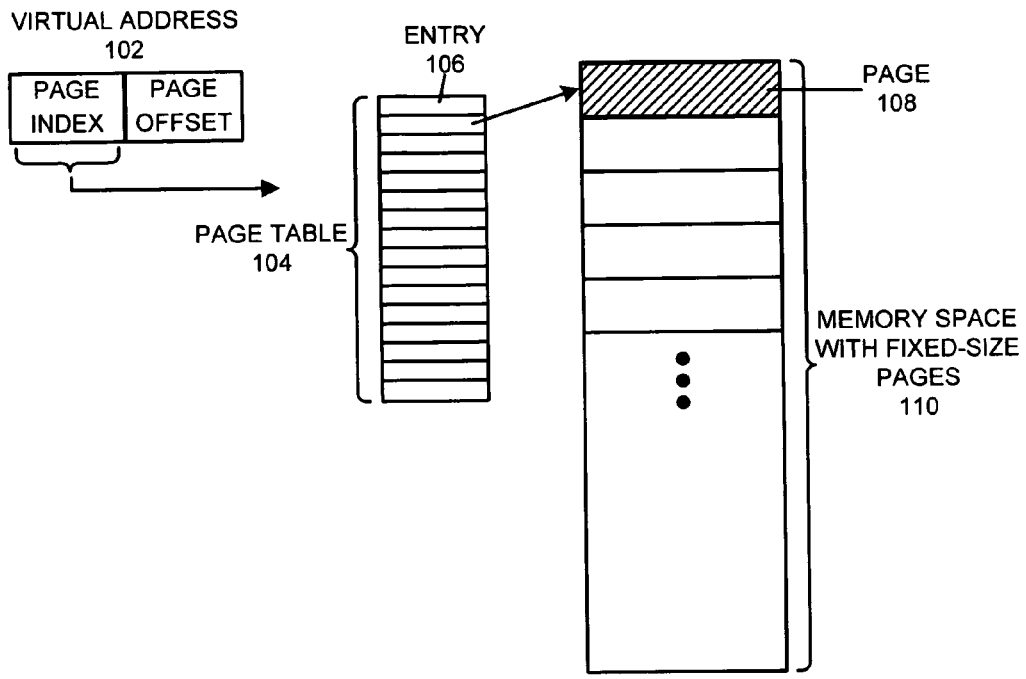
FIG. 1 illustrates paging with fixed-size pages in accordance with an embodiment of the present invention.

FIG. 1 illustrates paging in a system where a memory space is divided into fixed-size pages 110. When the system receives a virtual address 102, it uses a portion of the virtual address 102 as an index into a page table 104. The index determines the corresponding entry 106 in the page table, which in turn contains a pointer to the physical memory page 108 that contains the data referred to by the virtual address. Some of the non-index bits (the page offset) in the virtual address indicate the offset of the desired address from the beginning of the page.

Figure 2:
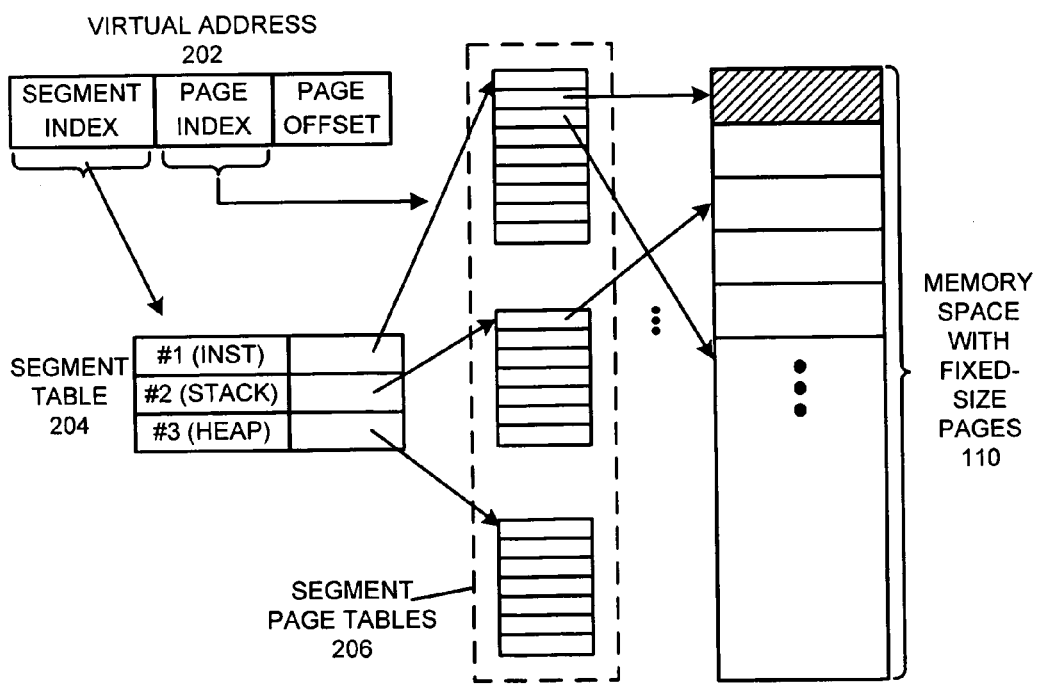
FIG. 2 illustrates paged segmentation in accordance with an embodiment of the present invention.

FIG. 2 illustrates paged segmentation, which is a slightly more sophisticated approach. Paged segmentation segments a process' memory space such that each desired memory segment has a separate page table. For instance, the process illustrated in FIG. 2 is split into separate segments for instructions, stack memory, and heap memory. Each entry in the process segment table 204 includes a segment number and a pointer to a separate segment page table 206. In this scheme, a portion of the virtual address 202 indicates the segment index, which determines which page table the page index applies to. Paged segmentation allows the system to take advantage of the benefits of paging while providing protection and sharing along segment boundaries.

Since accessing the page table leads to multiple levels of indirection during address translation, multiple memory references may be required to access the actual data. A TLB that caches recently-translated addresses can speed up this lookup process.

Page size plays an important role in overall system behavior and performance. With larger pages, the memory overhead of both the page table and the TLB are reduced, which often results in higher TLB hit ratios. However, large pages can lead to coherence issues as well as additional overhead due to a higher likelihood of simultaneous access attempts from multiple processes.

The number of entries in a page table is typically equal to the size of the memory space divided by the page size. Internal fragmentation adds an additional overhead of roughly half of a page. Overhead can thus be estimated by the equation:

$$\text{Overhead} = \left(\frac{PE}{2} + \frac{S}{P}\right)$$

where P=Page Size, E=Page Table Entry Size, and S=Address Space Size,

While minimal page table overhead occurs when P=roughly $O(\sqrt{S})$ (as described in Tanenbaum, A., *Operating Systems: Design and Implementation*, Prentice Hall, 1987), many other factors affect page size, such as memory utilization, memory and disk access characteristics, and page fault overhead. Currently, all existing paging schemes use either a single fixed page size for all processes or a small number of selectable page sizes which are manually specified at the initiation of a process and remain unchanged during the execution of a process. In the latter case, the page size selection is usually based on segments, and each segment of a process (e.g. heap, stack, etc.) can have only one fixed page size.

Adaptive Page Sizes for Segments

Figure 3:
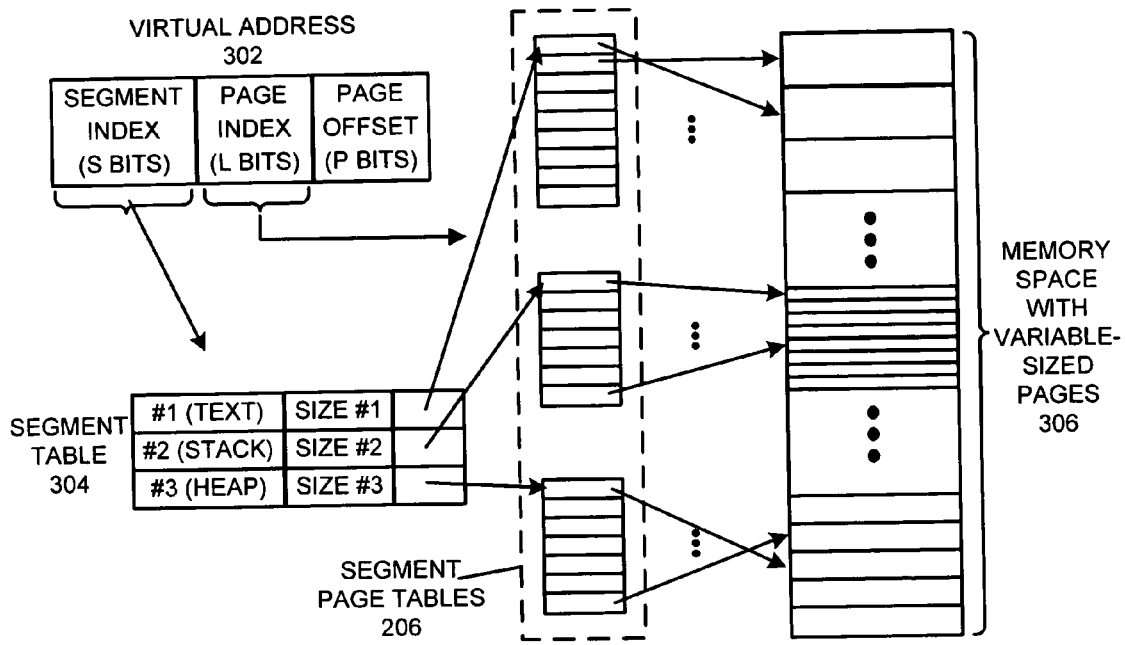
FIG. 3 illustrates paged segmentation with different page sizes for different segments in accordance with an embodiment of the present invention.

Since paged segmentation logically divides the memory system into a set of separate segments, one possible extension of paged segmentation allows each segment to maintain a separate page size. FIG. 3 illustrates paged segmentation with different page sizes for each segment. In this scheme, the segment table 302 expands to include a variable-length field in each segment table entry that indicates the page size for the segment.

In FIG. 3, the format of the virtual address 302 becomes somewhat variable. Supposing the virtual address contains 'V' bits in total, the leading 'S' bits are fixed and continue to indicate an index into the segment table. However, the next 'L' and 'P' bits, which represent the page index and page offset, respectively, can change per segment depending on the page size of the segment. For instance, changing a segment with a smaller page size requires fewer bits in the page offset, but as a direct result will require more pages and thus a correspondingly larger page index field. Address mapping becomes slightly more complex in a memory space with variable-sized pages 306, but is essentially similar to that of traditional paged segmentation with some additional mechanisms that take into account detection of the different page sizes.

Allowing different page sizes for different segments allows each segment to be sized such that the total page table overhead is optimal. For a set of segments $S_1, S_2, \ldots, S_n$, a function floor__2(x) that computes the largest integer power of 2 less than or equal to x enables the system to compute an optimal page size $P_i$=floor__2($\sqrt{S_i}$) for each segment $S_i$ (where i=1, 2, . . . , n). The sum of these page sizes results in an optimal total page table size, specifically:

$$\text{Total Page Size} = \left(\frac{S_1}{P_1} + \frac{S_2}{P_2} + \ldots + \frac{S_n}{P_n}\right)$$

where $P_i$=Page Size of Segment i.

Adaptive Page Sizes on a Per-Page Basis

Figure 4:
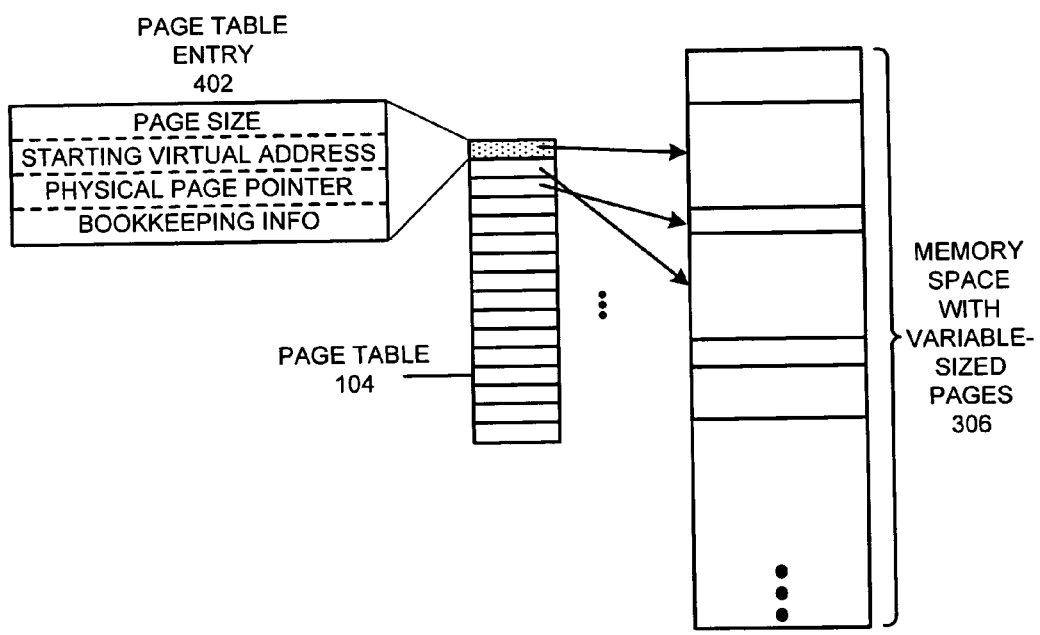
FIG. 4 illustrates a page table in which every page can have a different page size in accordance with an embodiment of the present invention.

While the previous sections describe a system in which each memory segment can have a different page size, generalization can be introduced and restrictions further relaxed so that each page table allows multiple sizes. FIG. 4 illustrates a page table in which every page can have a different page size.

The page size is now stored in each page table entry 402 instead of in the segment table, and the memory space contains variable-sized pages 306. Additionally, a page table entry must also store the starting address of the corresponding virtual page, since the simple indexing scheme used in traditional paging to translate from virtual to physical pages via a contiguous linear array is no longer feasible with adaptive page sizes.

The system must search through the page table entries to determine the correct physical page for a virtual address. Given a virtual address A, the system finds a matching entry by stepping through the page table comparing A to the range defined by the starting virtual address and the page size field of each entry. Although pages can vary in size, the system prevents any overlap between pages, and thus ensures that a virtual address will only be present in one page table entry's range.

Figures 5A, 5B:
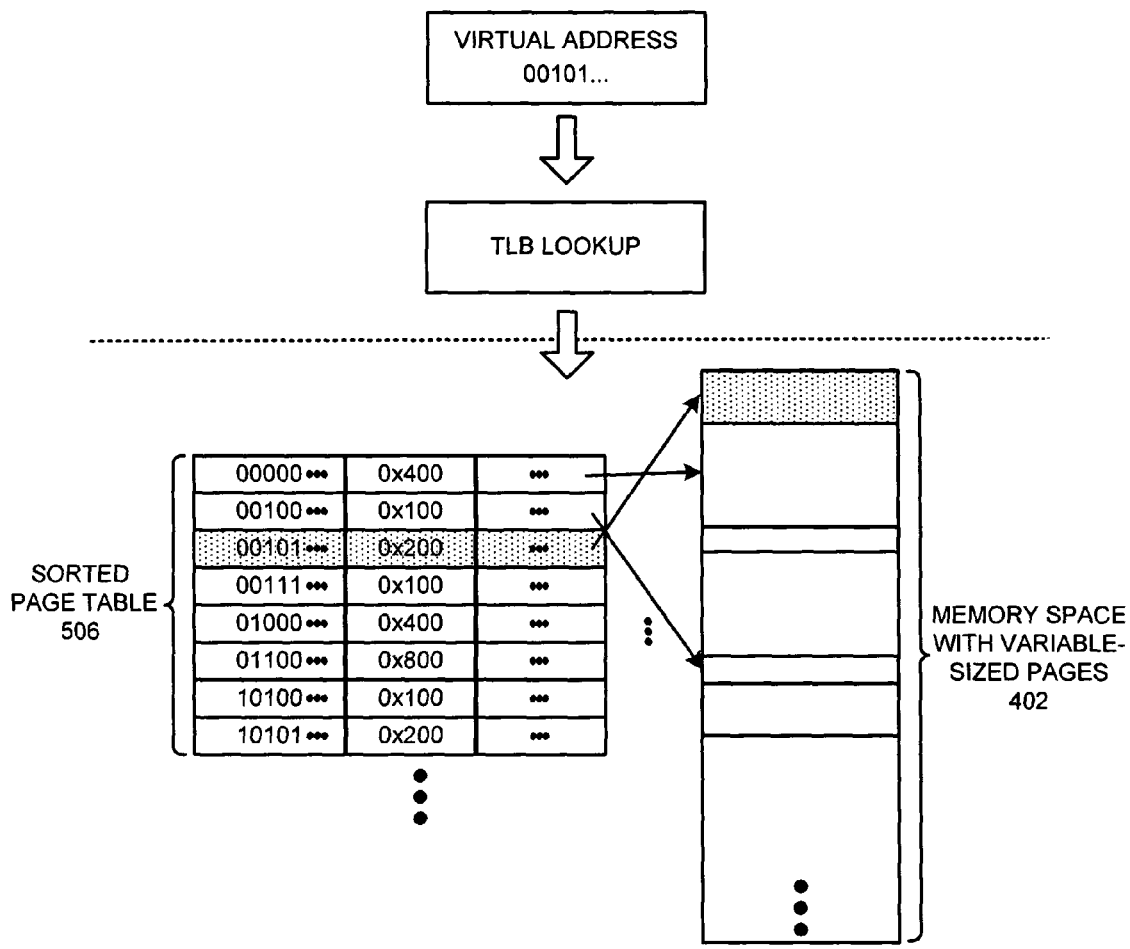
FIG. 5A illustrates the fields of a page table entry that supports adaptive page sizes in accordance with an embodiment of the present invention.
FIG. 5B illustrates a page table with adaptive page sizes sorted by starting virtual address in accordance with an embodiment of the present invention.

The system can sort page table entries by the starting virtual addresses of the pages to improve page lookup performance. FIG. 5B illustrates a page table sorted by starting virtual address, which facilitates a binary search on the sorted page table 506 and thus allows a more efficient search of the address space during a TLB lookup miss. While sorting and binary search are more time-intensive than the index lookup associated with fixed-size paging, the amortized cost is relatively small, because of both the high TLB hit rates that result from spatial or temporal locality in memory references and the infrequency of the page table reorganization operation introduced by page splitting or merging. This search process can also be enhanced using hashing techniques.

Address Translation

Figure 6:
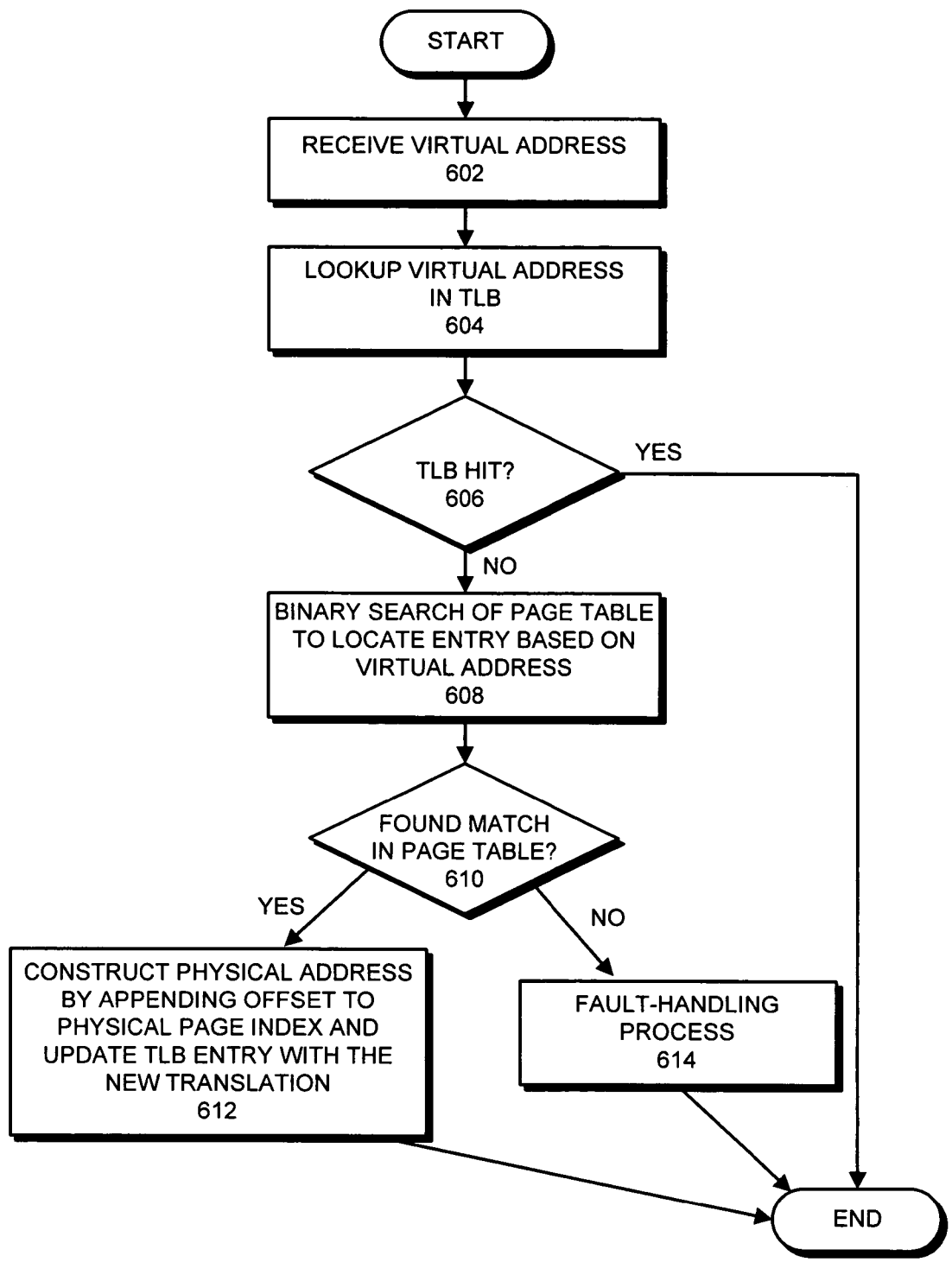
FIG. 6 presents a flowchart illustrating address translation in accordance with an embodiment of the present invention.

FIG. 6 presents a flow chart that illustrates the translation of a virtual address to a physical address in a system that supports adaptive page sizes. The process begins when the system receives a virtual address (step 602). The virtual address is first compared to the virtual addresses in the TLB (step 604). As with page table lookups, the TLB must take into account page size when comparing the virtual address with the cached virtual page indices, for instance by comparing multiple sizes in parallel and then using a multiplexer to take the correct result.

If the system finds a match in the TLB (step 606), the TLB returns the cached physical page index and the translation is complete. Alternatively, if the TLB misses, the system can perform a binary search of the page table to locate an entry that includes the virtual address (step 608). If a match is found (step 610), the physical address is constructed by appending the appropriate bits for the page offset to the physical page index and the TLB entry is updated with the new translation (step 612). If the search does not find a match, the system initiates a fault-handling process (step 614).

Paging Policy

A paging policy that determines optimal page sizes is an important aspect of adaptive page sizing. Examples of possible policy decisions include:

Minimizing the memory overhead of the page table and fragmentation;

Minimizing the TLB miss ratio by using very large page sizes, and thus a very small number of pages;

Minimizing input/output overhead, false data sharing, and consequently coherence overhead by using small pages; and Minimizing a heuristically-weighted sum of several criteria.

A potential shortcoming of this automatic page-resizing approach is that some class of applications might introduce increased overhead for global paging and swapping as well as less efficient resource utilization due to a decreased degree of sharing among physical pages both in memory and on disk.

Such a system with adaptive page sizing can also support dynamic changes to page sizes. For instance, since a large page is more likely to incur contention penalties from increased data sharing, a natural system response solves this problem by splitting a page in half when contention has reached some threshold. When such a split occurs, the system inserts a new entry between the original page entry and the subsequent entry in the page table. Dynamic page size changes can also be performed in the previous system (Adaptive Page Sizes for Segments), but only simultaneously for all of the pages in a segment.

Page merges are also feasible, as long as the two pages are adjacent, equal in size, and properly aligned (in both the virtual and physical address spaces). When such a merge occurs, the system deletes an entry from the page table. Thorough process page-merging can be applied during process swapping.

The primary drawback of page resizing is that since the page table is ideally ordered based on virtual address, page size changes require the page table to be modified. The system can be optimized to track cost data and perform such operations only when they are cost effective.

The concept of adaptive page sizing is a stand-alone technique that can be used to extend other memory-mapping schemes, and can be applied anywhere paging is used, including traditional (application-specific) paging, multi-level hierarchical paging, segmented paging, and paged segmentation. The concept can also be further applied to segmentation itself, where the segment boundary is mutable, and the segment number is dynamically determined in a way similar to the adaptive paging system described.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for performing a page-table lookup in a manner that supports adaptive page sizes, comprising:

maintaining a page size for each page table entry in a set of page table entries in a page table, wherein the page size of a page table entry changes, during execution of a process, based on contention for the page table entry;

receiving a virtual address;

looking up the virtual address in the page table by performing a binary search on addresses in the page table to find an entry where the virtual address is in a range defined by the entry's starting virtual address and the entry's page size field, wherein the entries in the page table are sorted by a starting virtual address in the page table entry; and wherein during the lookup process the page size is used to determine a number of bits that must be compared to find a matching page table entry;

determining that a page table entry matches the virtual address if a virtual address in the page table entry matches the virtual address in the determined number of bits; and if a matching page table entry is found, returning a physical page address from the matching page table entry.

2. The method of claim 1, wherein physical pages are disjoint, such that a virtual address can only be present in one physical page.

3. The method of claim 2, wherein changing the page size of the physical page dynamically optimizes performance criteria, including:
- minimizing memory overhead and fragmentation of the page table;
- minimizing the miss ratio of a translation look-aside buffer (TLB);
- minimizing overhead in an input/output (I/O) system;
- reducing contention for memory pages; or
- minimizing a heuristically-weighted sum of several criteria.

4. The method of claim 2, wherein looking up the virtual address in the page table involves first looking up the page table entry in a TLB which caches recently-accessed page table entries.

5. The method of claim 4, wherein the page table is ordered by the starting address of virtual pages, and wherein if the TLB lookup fails, performing a lookup in the page table in main memory involves executing a binary search operation to determine which page table entry corresponds to the virtual address.

6. The method of claim 1, wherein maintaining the page size for each physical page in the page table involves:
- maintaining a segment table which includes entries for different memory segments;
- wherein a given segment table entry contains a pointer to the page table for a corresponding memory segment; and
- wherein the segment table entry contains a physical page size for all of the physical pages in the memory segment.

7. The method of claim 1, wherein the method can be applied to a number of paging variations including:
- segmented paging;
- traditional paging;
- multi-level hierarchical paging; or
- paged segmentation.

8. The method of claim 1, wherein the page size in an entry is independently updated when a corresponding physical page is split or merged.

9. The method of claim 1, wherein the page size indicates an arbitrarily and dynamically-sized physical memory block.

10. A non-transitory computer-readable storage medium storing instructions that when executed by a computer cause the computer to perform a method for performing a page-table lookup in a manner that supports adaptive page sizes, comprising:
- maintaining a page size for each page table entry in a set of page table entries in a page table, wherein the page size of a page table entry changes, during execution of a process, based on contention for the page table entry;
- receiving a virtual address;
- looking up the virtual address in the page table by performing a binary search on addresses in the page table to find an entry where the virtual address is in a range defined by the entry's starting virtual address and the entry's page size field,
  - wherein the entries in the page table are sorted by a starting virtual address in the page table entry; and
  - wherein during the lookup process the page size is used to determine a number of bits that must be compared to find a matching page table entry;
- determining that a page table entry matches the virtual address if a virtual address in the page table entry matches the virtual address in the determined number of bits; and
- if a matching page table entry is found, returning a physical page address from the matching page table entry.

11. The non-transitory computer-readable storage medium of claim 10, wherein physical pages are disjoint, such that a virtual address can only be present in one physical page.

12. The non-transitory computer-readable storage medium of claim 11, wherein changing the page size of the physical page dynamically optimizes performance criteria, including:
- minimizing memory overhead and fragmentation of the page table;
- minimizing the miss ratio of a translation look-aside buffer (TLB);
- minimizing overhead in an input/output (I/O) system;
- reducing contention for memory pages; or
- minimizing a heuristically-weighted sum of several criteria.

13. The non-transitory computer-readable storage medium of claim 11, wherein looking up the virtual address in the page table involves first looking up the page table entry in a TLB which caches recently-accessed page table entries.

14. The non-transitory computer-readable storage medium of claim 13, wherein the page table is ordered by the starting address of virtual pages, and wherein if the TLB lookup fails, performing a lookup in the page table in main memory involves executing a binary search operation to determine which page table entry corresponds to the virtual address.

15. The non-transitory computer-readable storage medium of claim 10, wherein maintaining the page size for each physical page in the page table involves:
- maintaining a segment table which includes entries for different memory segments;
- wherein a given segment table entry contains a pointer to the page table for a corresponding memory segment; and
- wherein the segment table entry contains a physical page size for all of the physical pages in the memory segment.

16. The non-transitory computer-readable storage medium of claim 10, wherein the method can be applied to a number of paging variations including:
- segmented paging;
- traditional paging;
- multi-level hierarchical paging; or
- paged segmentation.

17. The non-transitory computer-readable storage medium of claim 10, wherein the page size in an entry is independently updated when a corresponding physical page is split or merged.

18. The non-transitory computer-readable storage medium of claim 10, wherein the page size indicates an arbitrarily and dynamically-sized physical memory block.

19. An apparatus that performs a page-table lookup in a manner that supports adaptive page sizes, comprising:
- a page-size-maintaining mechanism configured to maintain a page size for each page table entry in a set of page table entries in a page table, wherein the page size of a page table entry changes, during execution of a process, based on contention for the page table entry;
- a receiving mechanism configured to receive a virtual address;
- a lookup mechanism configured to look up the virtual address in the page table by performing a binary search on addresses in the page table to find an entry where the virtual address is in a range defined by the entry's starting virtual address and the entry's page size field, wherein the entries in the page table are sorted by a starting virtual address in the page table entry; and wherein during the lookup process the page size is used to determine a number of bits that must be compared to find a matching page table entry;

a comparison mechanism configured to determine whether a page table entry matches the virtual address by comparing the determined number of bits of the virtual address with a virtual address in the page table entry; and a response mechanism, wherein if a matching page table entry is found, the response mechanism is configured to return a physical page address from the matching page table entry.

* * * * *